July 22, 1941.  D. F. O'BRIEN  2,249,848
FRANGIBLE HYDRANT
Filed June 22, 1939
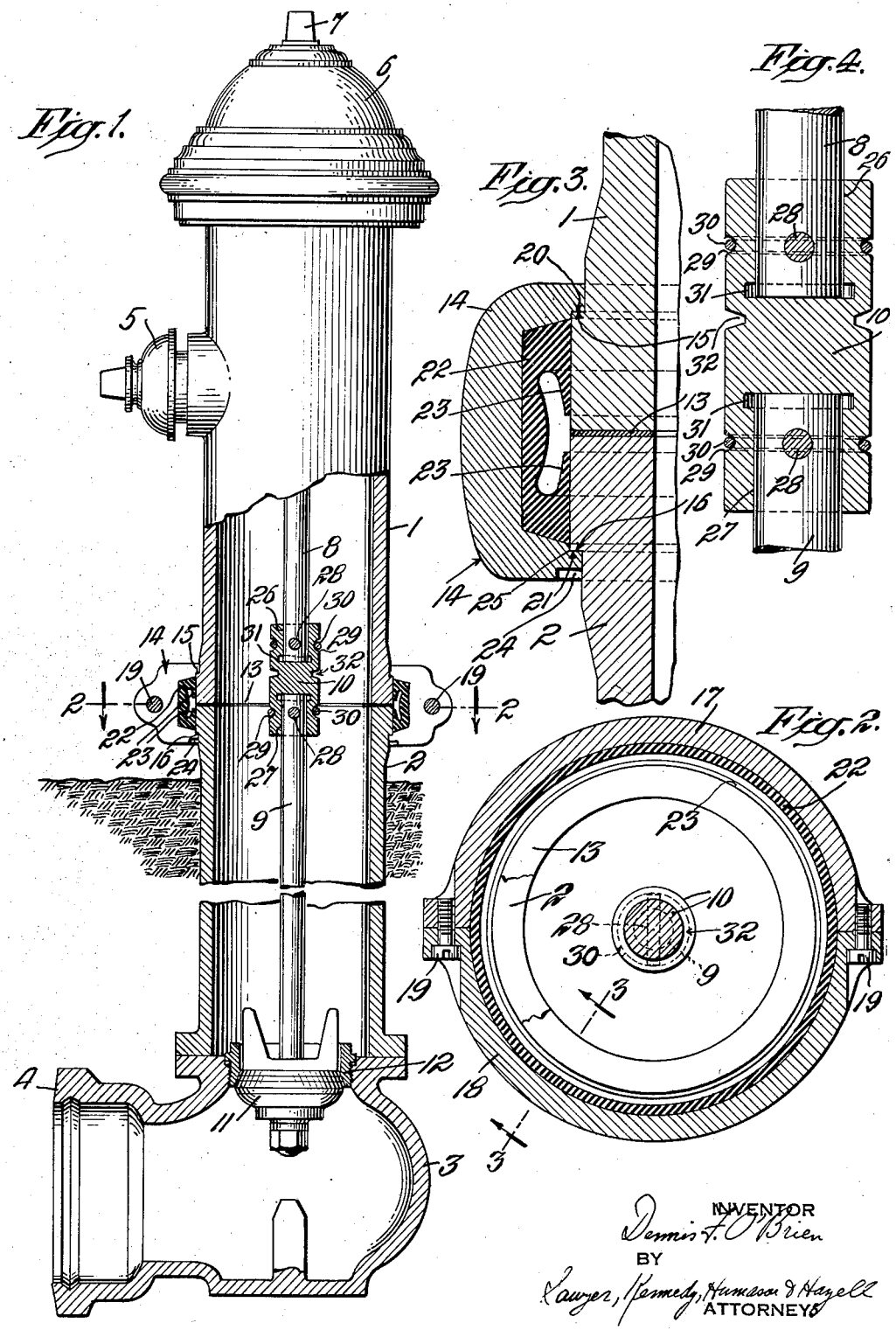
INVENTOR
Dennis F. O'Brien
BY
Sawyer, Kennedy, Humason & Hazell
ATTORNEYS Patented July 22, 1941

2,249,848

UNITED STATES PATENT OFFICE 2,249,848

FRANGIBLE HYDRANT

Denis F. O'Brien, East Orange, N. J.

Application June 22, 1939, Serial No. 280,478

2 Claims. (Cl. 287—108)

This invention relates to improvements in fire hydrants and more particularly in frangible couplings for valve stems.

It is an object of the invention to provide couplings of great strength under service conditions, but which are readily fracturable under impact heavy enough to threaten damage to a hydrant.

It is a further object to provide couplings which are inexpensive to manufacture and are replaceable when broken with a minimum amount of labor and delay.

With the foregoing objects and others which will appear in the following full description in mind, the invention consists in the combinations and arrangements of parts and details of construction which will now be fully described in connection with the accompanying drawing and then pointed out more particularly in the appended claims.

In the drawing:

Fig. 1 is a side view partly in elevation, and partly in vertical section, of a hydrant embodying the invention in a preferred form;

Fig. 2 is a horizontal section on the line 2—2 of Fig. 1 as to the hydrant casing but through a groove located near the middle of the valve stem coupling, and on an enlarged scale;

Fig. 3 is a vertical section taken on the line 3—3 of Fig. 2 and further enlarged; and Fig. 4 is an enlarged fragmentary view showing the valve stem coupling of Fig. 1.

Referring to Fig. 1 showing the general construction of the hydrant, the hydrant casing is composed of an upper section 1 resting upon a lower section 2 which in turn is attached to a valve casing 3 connected at 4 to a main (not shown) in the usual way. The hydrant is provided with the usual fitting 5 for attachment of a hose and is surmounted by a head 6 with the usual nut 7 for opening and closing the valve. The valve stem is composed of two sections 8 and 9 joined by the coupling 10, later to be described in detail, and lowered and raised by means of the nut 7 through screw mechanism of any usual type (not shown) to operate the valve 11 which seats upwardly against valve seat 12. Casing sections 1 and 2 are separated by a gasket 13 to reduce leakage and held together in alinement by a coupling 14. The present invention consists particularly in the construction of the valve stem coupling 10 and in the way in which this part is rendered frangible. Those features of the construction relating to the casing coupling specifically and more broadly to both the casing coupling and the valve stem coupling are claimed in my copending application Serial No. 308,945, filed December 13, 1939, and being a division of the present application which is directed more particularly to the features of the invention relating to valve stem coupling.

As shown in Figs. 1, 2 and 3, the casing sections 1 and 2 are formed with shoulders 15 and 16 near their ends and forming generally horizontal annular surfaces for engagement by coupling 14. The coupling 14 is composed of two parts 17 and 18 held together by screws 19 and provided with inner surfaces 20 and 21 to engage the surfaces 15 and 16 respectively.

As best shown in Figs. 2 and 3, the casing section ends beyond shoulders 15 and 16, are of generally cylindrical form and the coupling 14 is hollowed out to accommodate a sealing member 22 made of flexible material such as rubber and having the form of a continuous tire with inturned flanges 23. As will be readily understood, any water escaping past washer 13 will tend to force the flanges 23 against the casing ends providing an extremely tight seal.

Coupling 14 is rendered frangible by forming the metal below surface 21 into a flange of the desired thickness, as by forming the members 17 and 18 with a groove or recess 24, as shown. It will be understood that surfaces 15, 16, 20 and 21 are finished to provide proper engagement between coupling 14 and the casing sections 1 and 2. The coupling sections are preferably formed by casting, however, and preferably made of such material as cast iron, which has desirable characteristics of strength under steady stresses together with liability to fracture under undue impact or sudden stress. As is evident, impact of a vehicle against the upper casing section 1 is communicated to the metal below surface 21 as a shear, substantially in alinement with the outer surface of the end of casing section 2. Moreover, any force tending to rock the casing section 1 will be borne initially by one side only of the surface 21, rendering fracture of this member under collision relatively easy and insuring breaking of the coupling before any possible damage to the hydrant section can occur.

The frangible casing coupling combined with the seal external to the hydrant casing and constituting the particular casing coupling and seal by means of which the casing is rendered frangible to produce fracture of the valve stem coupling is claimed in my above-mentioned divisional application, but its operation is described in the present case for completeness of illustration.

It has previously been proposed to employ frangible couplings capacitated to draw the hydrant casing sections together, either by means of bolts or right and left hand threading in the coupling itself, the hydrant being sealed solely by means of a gasket or the like. This practice requires, however, considerable pressure between the casing sections to prevent leakage, and the frangible couplings are subjected to correspondingly heavy stresses. In addition, the couplings are required to withstand abuse resulting from over-tightening by the workmen of the screw mechanisms provided for tightening the coupling. As a result, it has been found that prior art couplings show a definite tendency to fail to break under impact sufficient to damage a hydrant, when made strong enough to produce a proper seal.

The coupling of the invention, however, is required in service, to withstand only the tension produced by water pressure within the casing. For example, the coupling surfaces 20 and 21 may be separated by a distance somewhat greater than that between the shoulders 15 and 16 on the casing sections when the latter are separated by a given gasket 13, a perfect seal being still provided by the ring 22. Under these conditions, as is apparent, the frangible coupling is required in service to withstand only the tension produced by water pressure within the hydrant, and it becomes possible to construct the coupling so as to insure breakage under impact of a dangerous magnitude without creating any liability to failure under service conditions.

The valve stem coupling 10 comprises a body member formed with oppositely facing sockets 26 and 27 to receive the valve stem sections 8 and 9. These sections are attached to the coupling 10 by means of pins 28 passing through them and through the walls of sockets 26 and 27. At the level of the pins 28 coupling 10 is provided with shallow grooves 29 receiving split spring hoops 30 which serve to hold the pins 28 in place, as best shown in Figs. 2 and 4.

As shown in Fig. 4, sockets 26 and 27 are cast with enlargements 31 at their inner ends, which facilitate finishing of their walls to fit valve stem sections 8 and 9. These sections may rest on the metal of coupling 10 separating sockets 26 and 27, or not, it being unimportant in the present construction whether they do so.

To ensure fracture of the coupling 10 when collision occurs, it is formed with an encircling groove 32, located close to one of the enlargements 31 in the axial direction and substantially in alinement with its outer edge, as shown in Fig. 4. The coupling 10, similarly to coupling 14, is preferably made of cast iron, the only finishing required being that of the walls of sockets 26 and 27 which engage the valve stem sections 8 and 9, and drilling holes for pins 228.

In this coupling, as in the hydrant casing coupling previously described, impact against hydrant casing section 1 is transmitted to the frangible portion of the coupling between enlargement 31 and groove 32 as a shear and in this case also the formation of the coupling by casting produces crystallization tending to predispose to fracture between the lower edge of the enlargement 31 and the groove 32.

When collision occurs, rocking hydrant section 1 on hydrant section 2, the outer coupling 14 breaks and the inner valve stem coupling 10 breaks instantaneously thereafter, permitting the upper half of the hydrant, together with valve stem section 8, to fall off the lower half. The valve 11 remains closed, or, in fact, will close immediately if open at the time of collision, due to water pressure within the casing 3. The repair of the hydrant after collision, according to the present invention, is extremely simple and involves only the following steps: A new coupling 10 is placed upon the lower valve stem section 9 and pin 28 and hoop 30 placed in position upon it. Valve stem section 8 is then inserted in the upper socket 26 and similarly secured in position. Sealing ring 22 may now be placed over section 1 or 2 and the former placed upon the latter. The ring is now pulled into position and a new pair of members 17 and 18 placed around it and fastened together with screws 19. At this point the operating structure of the usual type (not shown) is put in position and the head 6 of the hydrant fastened to it, completing the repair.

Among the advantages of the present invention, in addition to simplicity in use and manufacture, is the great strength of the couplings under service stresses together with a certainty of breakage under relatively slight impact, which insures protection of the hydrant itself. For example, with the present invention it has been found possible in a hydrant of ten inch diameter to construct the parts so that the outer coupling will withstand water pressures in excess of six hundred pounds per square inch, producing a tension on the coupling of the order of twenty to twenty-five tons, and yet have the coupling invariably break immediately upon collision with the hydrant of even a small baggage truck weighing a few hundred pounds and moving at little more than walking speed. In the case of the valve stem coupling it has been found possible to construct this member so as to withstand tension well in excess of five tons and at the same time to fracture upon impact against the valve stem, under test conditions, of a six pound weight dropping from a height of only two or three feet. As is apparent, the invention accordingly provides for ample factors of safety, both in the withstanding of service loads and in the protection of the hydrant against damage by collision.

What is claimed is:

1. A frangible coupling for hydrant valve stems comprising a member having oppositely facing sockets for engaging a pair of alined valve stem sections and a circumferential groove around said member extending radially inward thereof to substantial axial alinement with the bore of one of said sockets and spaced axially therefrom to define a frangible portion of thickness such as to carry service stresses and fracture under impact sufficient to damage a hydrant.

2. A coupling according to claim 1 in which the material of the said coupling has a crystal structure extending through said frangible portion between said last mentioned socket and said groove of the character produced by a casting operation without substantial filleting, whereby said coupling is predisposed to fracture in a predetermined zone in said frangible portion.

DENIS F. O'BRIEN.